US011640679B2

(12) United States Patent
Eastman

(10) Patent No.: US 11,640,679 B2
(45) Date of Patent: May 2, 2023

(54) AUGMENTED OR VIRTUAL REALITY CALIBRATION AND ALIGNMENT SYSTEM AND METHOD

(71) Applicant: ARUTILITY, LLC, Mason, MI (US)

(72) Inventor: Joseph Steven Eastman, Mason, MI (US)

(73) Assignee: ARUTILITY, LLC, Mason, MI (US)

(*) Notice: Subject to any disclaimer, the term of this patent is extended or adjusted under 35 U.S.C. 154(b) by 0 days.

(21) Appl. No.: 17/543,688

(22) Filed: Dec. 6, 2021

(65) Prior Publication Data

US 2022/0180562 A1  Jun. 9, 2022

Related U.S. Application Data

(60) Provisional application No. 63/199,231, filed on Dec. 15, 2020, provisional application No. 63/121,850, filed on Dec. 4, 2020.

(51) Int. Cl.
*G06T 7/80* (2017.01)
*G02B 27/01* (2006.01)
*G06T 19/00* (2011.01)

(52) U.S. Cl.
CPC ............... *G06T 7/80* (2017.01); *G02B 27/01* (2013.01); *G06T 19/006* (2013.01); *G02B 2027/0198* (2013.01)

(58) Field of Classification Search
CPC ......... G06T 7/80; G06T 19/006; G02B 27/01; G02B 2027/0198
See application file for complete search history.

(56) References Cited

U.S. PATENT DOCUMENTS

| | | | | |
|---|---|---|---|---|
| 10,037,627 | B2* | 7/2018 | Hustad | G06T 19/006 |
| 2020/0013227 | A1* | 1/2020 | Lyren | G06F 1/163 |
| 2020/0249819 | A1* | 8/2020 | Berquam | G06F 3/011 |
| 2022/0138467 | A1* | 5/2022 | Eastman | G06V 20/20 |
| | | | | 345/633 |

* cited by examiner

*Primary Examiner* — Doon Y Chow
(74) *Attorney, Agent, or Firm* — Loomis, Ewert, Parsley, Davis & Gotting PC; Mikhail Murshak

(57) ABSTRACT

An augmented reality (AR) or virtual reality (VR) calibration method including the steps of: (a) providing a computing device for displaying a base image of a surrounding environment, (b) obtaining location coordinates of the computing device; (c) initiating an executable application program for processing location data and generating an overlay image over the base image; (d) generating a virtual asset container and at least one digital object corresponding to the computing device, (e) determining a first location of the computing device at a local position within the asset container; (e) moving the computing device to a second location that is a determined distance in a direction from the first location, and (f) calculating a local rotation angle relative to a positive axis of the asset container and a rotation angle relative to a positive axis of a real-world coordinate system to determine an orientation difference.

19 Claims, 12 Drawing Sheets

AUGMENTED OR VIRTUAL REALITY CALIBRATION AND ALIGNMENT SYSTEM AND METHOD

CROSS REFERENCE TO RELATED APPLICATION

Priority is claimed to U.S. Provisional Application No. 63/121,850 filed Dec. 4, 2020, which is incorporated herein by reference in its entirety. Priority is also claimed to U.S. Provisional Application No. 63/199,231 filed, Dec. 15, 2020, which is also incorporated herein by reference in its entirety.

TECHNICAL FIELD

The present disclosure relates generally to the field of augmented reality (AR) calibration and alignment system, particularly related to locating, asset management, and visualization, and more particularly to systems configured for use with utility systems.

DESCRIPTION OF RELATED ART

Augmented reality (AR) and Virtual Reality (VR) systems are gaining in popularity and functionality. Although popular in gaming, commercialization of these platforms and applications is a growing area and a versatile system and process to properly align and accurately place a user within an environment in an effective way is challenging.

Public and private utility providers will typically own, and/or operate, some combination of water, power, gas, electric, steam and chilled water utilities. These providers have specific functions and responsibilities for which they are obligated to perform. Those responsibilities range from responding to utility staking requests to preparing an asset inventory for an approved asset management plan. Often, these services are critical to any type of construction, development, infrastructure and/or renovation project. More efficient utility staking and locating solutions are often sought.

U.S. Pat. No. 10,037,627 to Hustad, et al. provides for an augmented visualization system for hidden structures. The system includes a camera operable to capture a base image of a field of view. A spatial sensor is configured to sense a position of the camera and to generate positional information corresponding to the position. A controller is in communication with the camera, the spatial sensor, and a data source having stored geospatial data. The controller is configured to determine when the geospatial data corresponds to a location in the field of view of the camera based on the positional information. The controller is also configured to generate a geospatial image in response to the controller determining that the location corresponding to the geospatial data is in the field of view. A display is in communication with the controller and is operable to display a composite image in which the geospatial image is overlaid with the base image.

However, AR and VR applications continue to struggle with alignment with the real-world in order to display objects in their actual geographic locations. Accordingly, a need remains for improved locating, managing, and visualizing accurate data information and displaying that information through augmented reality.

SUMMARY

The present disclosure provides for an augmented reality (AR) system or method for calibrating, visualizing, and displaying the user's surrounding environment to accurately align a user with respect to surrounding environment. An augmented reality (AR) or virtual reality (VR) calibration system is provided to facilitate this visualization, display, coordination, and alignment of a user to accurately align the user in a real-world location. The system/process includes a camera for generating a base image of the user's surrounding location, a processor, a controller and wireless communication module, a computing device (i.e., a mobile device—smart phone, tablet or head mounted display) having a display for exhibiting a view from the camera, and an AR or VR application program hosted on the computing device or accessed remotely by the computing device and executed by the controller for processing data. The AR or VR application will display a virtual or augmented image of a digital image, object, or hidden or unhidden asset corresponding to the processed result. The controller can be updated in real or almost real time to acquire positioning data. The result includes a coordinate axis of the user identified at an initiation step calibrated to true north to sync with a coordinate axis of the existing world. The program is configurable to execute the calibration at various levels of GPS accuracy. In an example, the program is configured to execute the calibration from start to finish within 60 seconds, or within 30 seconds, or within 10 seconds or within 5 seconds.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate systems and method(s) of use for the present disclosure constructed and operative according to the teachings of the present disclosure.

The various embodiments of the present disclosure will hereinafter be described in conjunction with the appended drawings, wherein like designations denote like elements.

DETAILED DESCRIPTION

The present disclosure relates to commonly owned non-provisional patent application Ser. No. 17/516,682 filed Nov. 1, 2021 and titled AUGMENTED REALITY UTILITY LOCATING AND ASSET MANAGEMENT SYSTEM, which claims priority to provisional patent application No. 63/107,772 filed Oct. 30, 2020, the subject matter of which is incorporated by reference herein in its entirety.

Referring to FIGS. 1-8, the present disclosure provides for a system and method for calibrating and aligning digital or virtual images/objects, within a surrounding environment of a user and corresponding to a "real-world" environment. "Real-world" is a term of art that reflects an accurate geographical location and surrounding environment that includes actual and existing structures and objects. In an example of the present disclosure, a display of digital and virtual objects is provided in an augmented or a virtual reality application in two-dimensional and three-dimensional renderings shown on a display. The present disclosure provides for a calibration system and method configured to ensure (or increase reliability and accuracy) that the digital objects appear at or near their actual geographic locations in the real-world and relevant to a user of the application. A digital model of a surrounding area can be generated that is correctly orientated and positioned with respect to actual surrounding environment in the real-world. This includes ensuring 0 (Zero) degrees from true north in a digital scene (i.e., a display on mobile device or user interface of a mobile device) is aligned with 0 degrees from true north in the real-world. Some images or objects that are hidden from plain view can be digitally generated and displayed overlaying a camera view corresponding to actual or near actual location within the surrounding environment.

Augmented reality ("AR") and virtual reality ("VR") applications struggle with precise alignment with the real-world in order to display objects in their actual geographic locations. This causes tremendous difficulty in commercialization and functionality with truly effective AR and VR solutions that demand a high degree of accuracy and precision. AR and VR applications can be executable computer programs accessible on a computer system having a system controller and coupled to at least one display screen.

Figure 1:
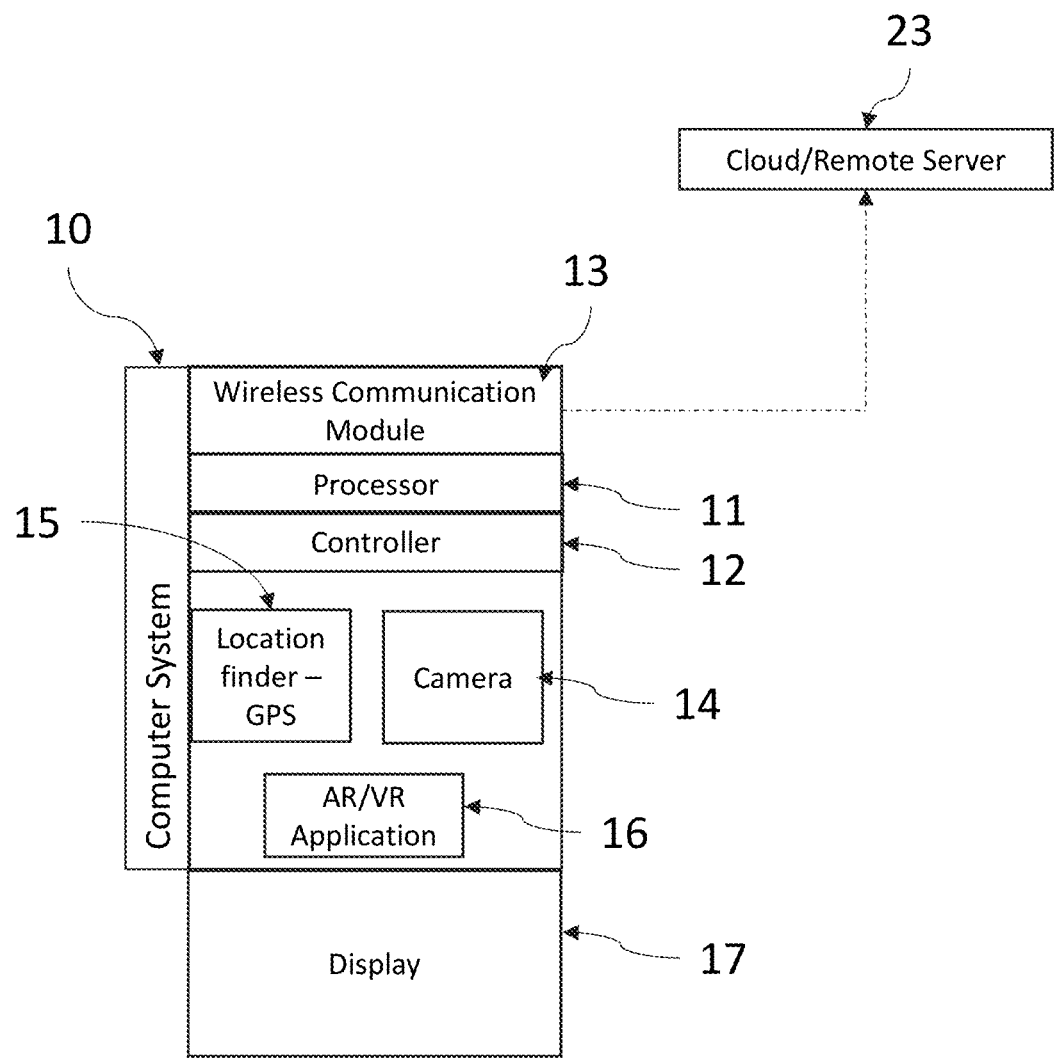
FIG. 1 shows a schematic of an example computer system for hosting, executing, and displaying an augmented or virtual reality application according to the present disclosure.
Figure 2:
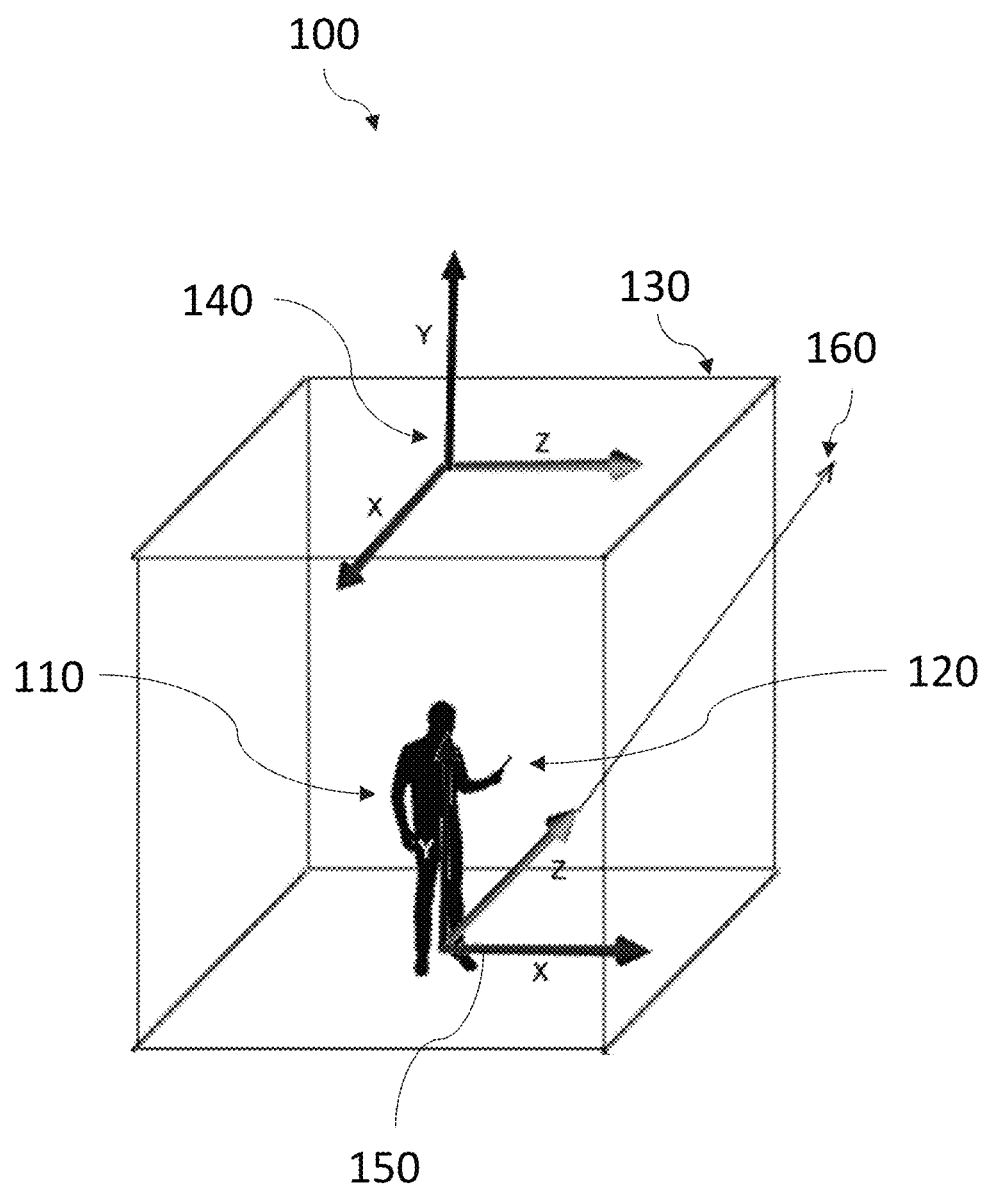
FIG. 2 shows a schematic of an asset container and a virtual user at a beginning step of a calibration process according to the present disclosure relative to a three-dimensional coordinate system represented by an x, y, and z axis.
Figure 3:
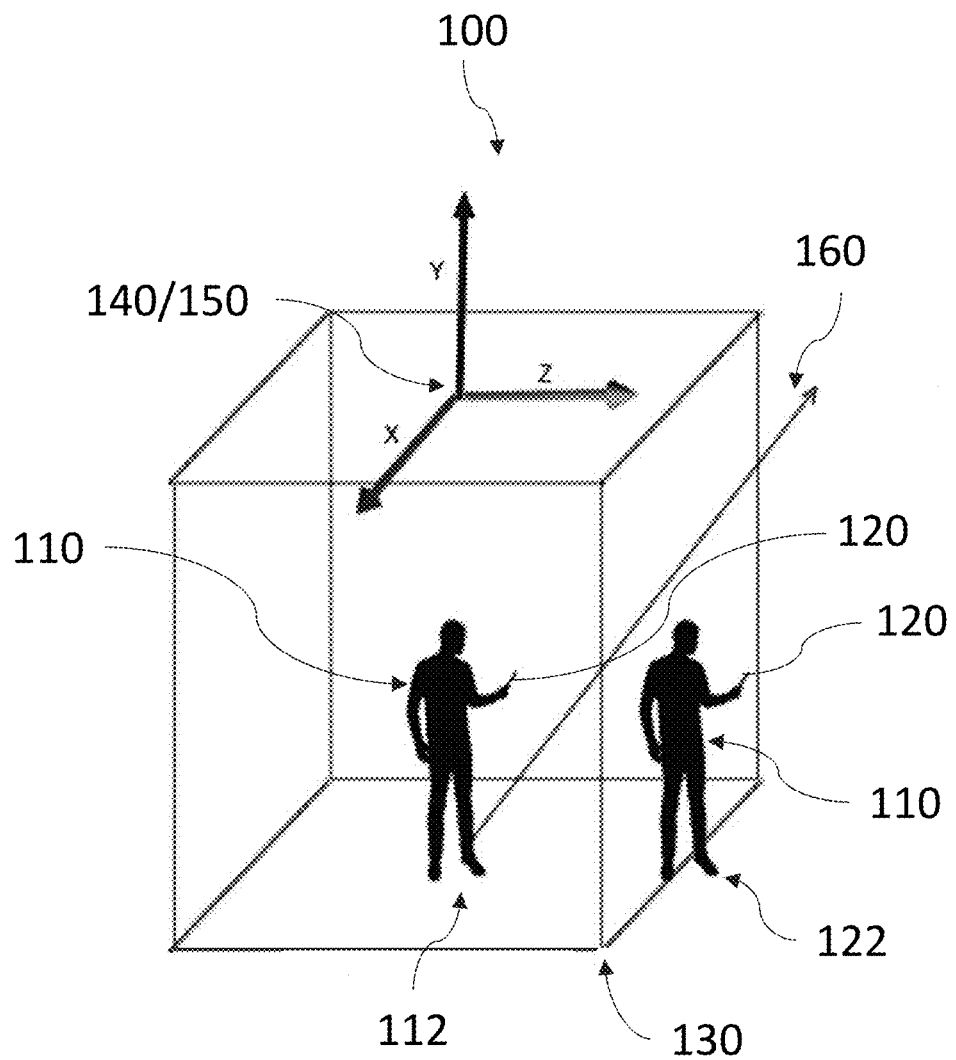
FIG. 3 shows the asset container from FIG. 2 with the virtual user moved from a first position to a second position within the asset container.

FIG. 1 illustrates a schematic of a computing system 10 for hosting and/or executing an AR/VR application 16 of the present disclosure. The computer system 10 can be any computing device including a mobile device like a mobile laptop, a tablet or smart phone or dedicated AR/VR device like headsets and glasses. Computing system 10 can include a processor 11, a wireless communications module 13, a controller 12, a location finder 15 like a global positioning system (GPS) for identifying a location of the device, a camera 14, and a display 17. The camera 14 is configured to provide a base image of a surrounding environment on the display 17. As the camera within the device or coupled to the device moves and a lens associated with the camera perceives different objects in the surrounding area, the base image also changes. The display 17 can be a touchscreen display 17. The wireless communication module 13 can be configured to communicate information from the computer system 10 to a cloud or remote server 23.

In an example, the AR/VR application 16 can be accessed remotely through a cloud-based communication and storage system 23 or locally on the controller 12 of the computer 10. The display 17 can include a touchscreen that allows for user-initiated modifications and actuation of certain functions. In use, the AR/VR application 16 will display objects/images on the system's display to be viewed/controlled/accessed or otherwise by a user. Initializing the AR/VR application 16, often referred to as "launch" of the application, the AR/VR application 16 must calibrate its location relative to the surrounding environment and with respect to the device.

An AR/VR application 16 of the present disclosure can be built into a computer program that can be downloaded or accessed via the desired computer system 10. In this example, AR/VR application 16 is a downloadable app hosted on a mobile device. This allows for viewing digital virtual objects overlaid on visual of a surrounding area base image accessed by camera 14. The virtual display over the environment display is visible on display 17. An example user can move the device 10 as desired causing the camera and view to move to adjust and change the perspective of the virtual objects with respect to the surrounding environment.

When an AR or VR application 16 is launched through a system controller 12, the AR or VR objects "world position and rotation" are relative to the controller's 12 position and orientation relative to a surrounding environment. The position of a user of the application 16 is determined in a coordinate system 140 to define a location in three-dimensional space defined by an x-axis coordinate, a y-axis coordinate and a z-axis coordinate. The coordinate system 140 is configured such that each axis is in a 90-degree relationship to the other and the y-axis defines a vertical axis while the x-axis and the z-axis each define a horizontal axis. For example, if a user is facing 90-degrees from true north in the real-world on application launch, a world coordinate system 140 will have its positive z-axis pointing 90-degrees from true north. This results in a digital scene having an orientation around the real-world y-axis that is off by 90-degrees. The application 16 must be used to correct for this orientation difference and correctly align the application world coordinate system 140 positive z-axis with true north, the real-worlds positive z-axis.

Referring to FIGS. 2 through 4A-4B, a calibration system of the present disclosure includes a schematic digital model 100 generated at a launch/initialization step. In this example, an AR application 16 provided on a mobile device 120 can be launched from a first location 112 of a virtual user 110. The virtual user 110 corresponds to an actual location of device 120 within an asset container 130 which is generated by the application. The asset container 130 defines a three-dimensional orientation 140 coordinate system along an x-y-z system that corresponds to that of a controller's world coordinate system 140. In this example, the controller is provided on a mobile device 120 like a smart phone or tablet.

Figure 4A:
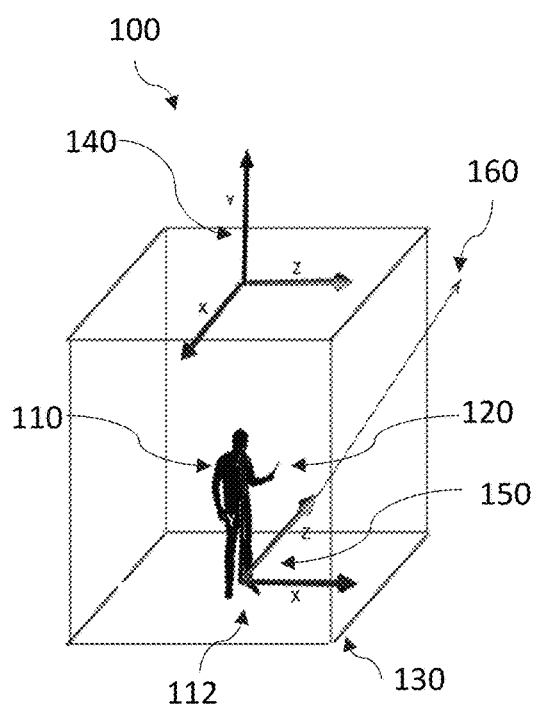
FIG. 4A illustrates an asset container with a virtual user at a start of a calibration process.
Figure 4B:
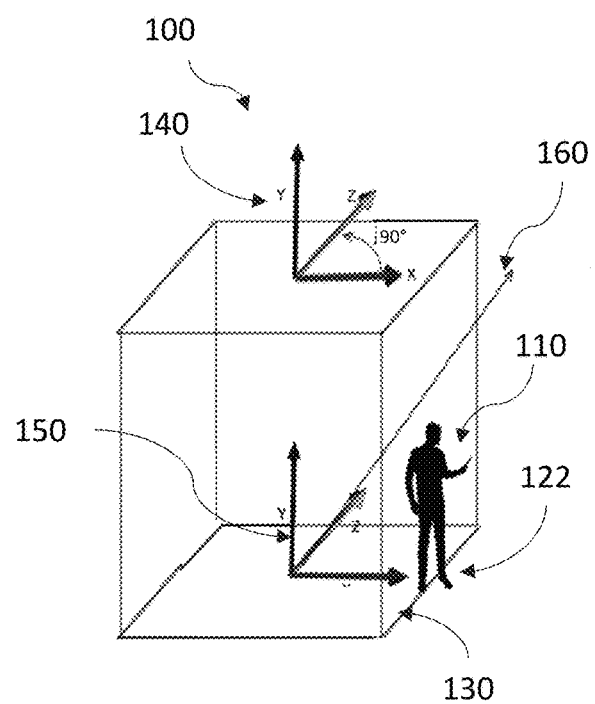
FIG. 4B illustrates the asset container from FIG. 4A with the virtual user moved to a completion step of the process.

As shown in this example, the initial position and orientation of the asset container 130 corresponding to coordinate system 140 in FIG. 4A does not properly align with a real-world geographic x-y-z coordinate system 150. The orientation of the x-axis and z-axis from coordinate system 140 is misaligned with respect to the actual coordinate system 150 at initiation. A user shown by virtual user 110 can move to a second location 122 to add an additional coordinate data point to the calibration application 100. The coordinate systems 140 and 150 become aligned providing for more accurate alignment for device 120 as can be seen with the coordinate system 140 rotated about 90 degrees to align the x-axis and the z-axis. Asset Container 130 is shown in FIG. 4B with the user 110 and device 120 moved from position 112 to position 122 within the asset container. The position data is received and processed through the application to swiftly realign the coordinate system 140.

After the calibration process, the coordinate system 140 and the position of the device 120 match that of the real-world coordinate system 150. In an example, the user 110 can move from a first position 112 to a second position 122 such that local coordinates of the user 110 shifted from (0,0,0) to (0,0,10). The coordinate system 140 for the asset container 130 has aligned with true north direction 160. The virtual user 110 and the mobile device 120 moves from a starting position 112 within the asset container 130 to a second position 122 where the completion of the calibration occurs, thus calibrating and properly aligning the coordinate system 140 of the asset container 130 to the real-world coordinate system 150. Longitudinal and lateral coordinates of the device can be obtained to be included in any evaluation performed by the calibration application. For example, user position 112 can be referred to as a local position at coordinates (0,0,0) with a latitude of 42.7250785264 and a longitude of −84.4511714226 and the location at position 122, with coordinates of (0,0,10) has a latitude of 42.7250785264 and a longitude of −84.4511341513.

Figure 5:
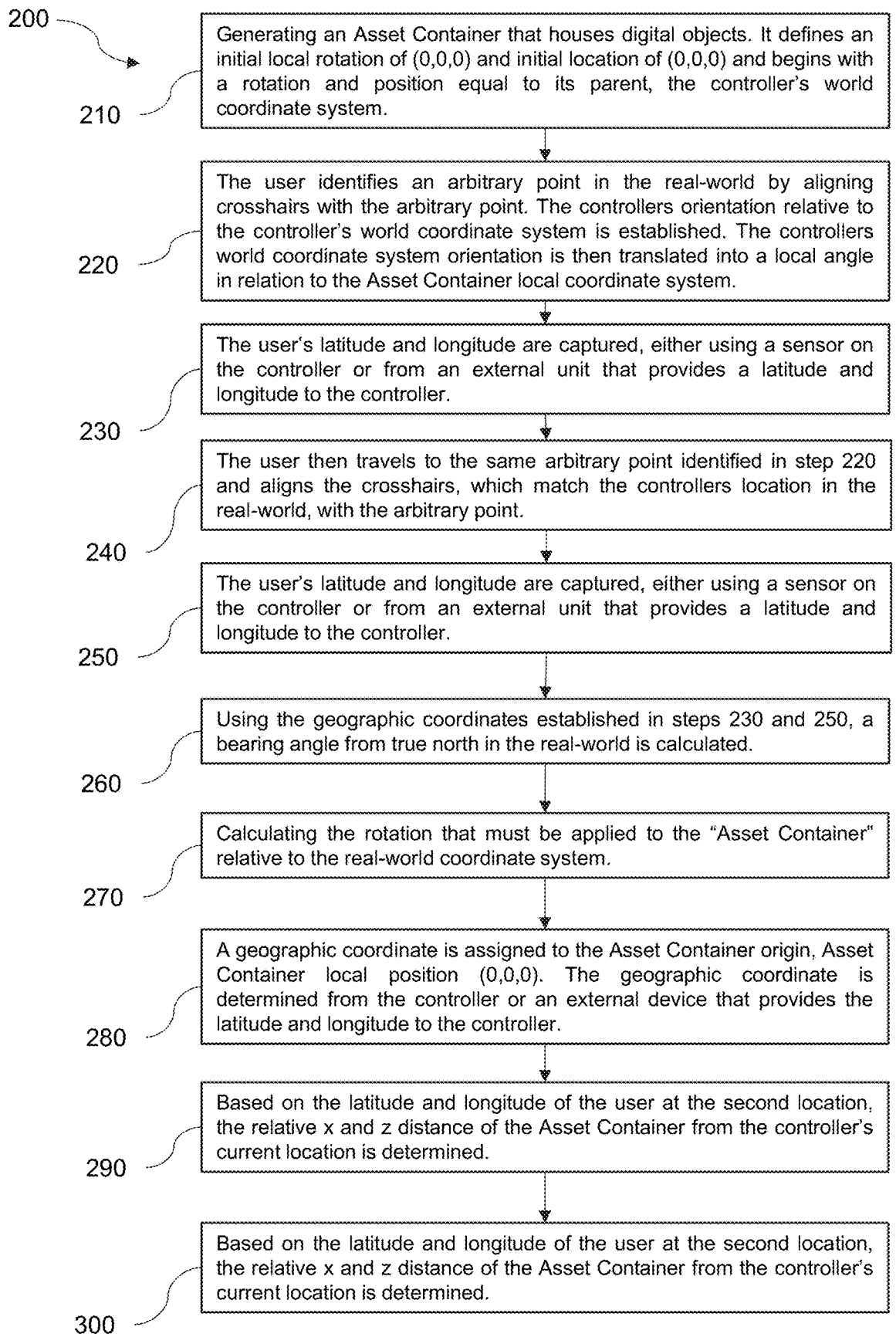
FIG. 5 is an example flow chart of the calibration and alignment process of the present disclosure.

Referring to the example process flow diagram 200 shown in FIG. 5, the present disclosure provides for a calibration process 200 that can be programmed into an application or downloadable program to be executed by a computer system or mobile device. The process includes the following steps:

In step 210: A virtual Asset Container is generated that houses digital objects. The asset container has an initial local rotation of (0,0,0) and initial location of (0,0,0). It begins with a rotation and position equal to its parent, the controller's world coordinate system.

The process continues to step 220 where an arbitrary point in the real-world is identified by pointing crosshairs (See FIG. 7, crosshairs 515) provided through the controller at the identified arbitrary point. The controller's orientation relative to the controller's world coordinate system is established and translated into a local angle in relation to the Asset Container local coordinate system.

The process continues to step 230 where latitude and longitude are captured or obtained, either using a sensor coupled to or integrated with the controller or from an external unit that provides a latitude and longitude to the controller. The controller can be paired with a high accuracy Global Positioning System (GPS), accessible either through the computing or mobile device or hosted on a module built into the computing or mobile device and in signal communication with the controller. The GPS is configured to provide a relatively accurate latitude and longitude coordinates. In an example, the accuracy is able to provide a location of 1-cm accuracy or below. Although this level of accuracy is useful, the process can function at a lesser degree of accuracy. The process remains the same regardless of accuracy of the latitude and longitude.

The process continues to step 240, wherein the user then moves to the location of the same arbitrary point identified in step 220 and aligns crosshairs, which match the controller's location in the real-world, with the arbitrary point identified in step 220.

At step 250, the latitude and longitude are captured again at the new physical location, either using a sensor coupled to or integrated with the controller or from an external unit that provides a latitude and longitude to the controller.

At step 260, using the geographic coordinates obtained in steps 230 and 250, a bearing angle from true north in the real-world is calculated.

The process advances to step 270, wherein, using the following formulas, the rotation that must be applied to the Asset Container relative to the real-world coordinate system is calculated:

(A) First, the controller's orientation relative to the controller's world coordinate system is established and translated into a local angle in relation to the Asset Container local coordinate system:

```
Quaternion localRotation = Quaternion.Inverse(assetContainer.transform.rotation)
* Camera.main.transform.rotation;
Float cameraYRotation = localRotation.eulerAngles.y;
if(cameraYRotation < 0){
cameraYRotation = cameraYRotation/-360;
float cameraYRotationFloored = Mathf.Floor(cameraYRotation);
float fractionalRotation = cameraYRotation - cameraYRotationFloored;
float positiveFractionRotation = 1 - fractionalRotation;
cameraYRotation = positiveFractionRotation * 360;
}else{
cameraYRotation = cameraYRotation/360;
float cameraYRotationFloored = Mathf.Floor(cameraYRotation);
float fractionalRotation = cameraYRotation - cameraYRotationFloored;
cameraYRotation = fractionalRotation * 360;
}
```

(B) Next, determine the angle between the two geographic coordinates relative to the real-world coordinate system positive z-axis:
Double System.Math.Cos(latitude2*System.Math.PI/180)*System.Math.Sin((longitude2*System.Math.PI/180)-(longitude1*System.Math.PI/180));
Double System.Math.Cos(latitude1*System.Math.PI/180)*System.Math.Sin(latitude2*Sysytem.Math.PI/180)-System.Math.Sin(latitude1*System.Math.PI/180)*System-.Math.Cos(latitude2*System.Math.PI/180)
*System.Math.Cos((longitude2*System.Math.PI/180)-(longitude1*System.Math.PI/180)); Double bearing=System.Math.Atan2(x,y)*180/System.Math.PI;
Double coordinateAngle=(bearing+360)%360;

(C) Next, get the final rotation to apply to the Asset Container: float rotation=cameraYRotation-(float)coordinateAngle.

Therefore, a −90-degree rotation would be applied to the Asset Container giving the following final orientation in FIG. 4B. As shown, the local coordinate system of the Asset Container now aligns perfectly with the real-world coordinate system and the Asset Container positive z-axis correctly points towards the real-world coordinate system positive z-axis (true north) in the real-world.

At step 280, a geographic coordinate is assigned to the Asset Container origin-local position (0,0,0). The geographic coordinate is determined from the controller or an external device that provides the latitude and longitude to the controller.

Advancing to step 290, based on the latitude and longitude of the user at the second location, the relative x and z distance of the Asset Container from the controller's current location is determined. This can be achieved by using formulas such as the Haversine Formula to calculate the distance.

At step 300 The Asset Container is then moved to the same controller world location and then translates the asset container the relative distances calculated in the prior step. This ensures the assets are displayed at or near their actual geographic locations.

Figure 6:
FIG. 6 shows an example screenshot from a mobile device displaying an augmented reality (AR) virtual content displayed over top of a camera view of a surrounding environment at a launch/initialization step of a calibration process of FIG. 5.

FIG. 6 shows a screenshot 500 from a mobile device having a display 501 displaying virtual content (image/object) 510 laid over top of a base image view 520 through a camera associated with the device of a surrounding environment in a position and orientation that are not correctly aligned with the real-world at the launch/initialization of the calibration process 200 with crosshairs 511 at a center of the display screen 501 to allow the user to identify an arbitrary point in the real-world by selecting the "Start Calibration" button 540. A function menu is also provided at menu button 530. The latitude and longitude of the controller are determined at this time. Additionally, using computer vision algorithms, in conjunction with other sensor readings on the controller, the controller's orientation relative to the controller's world coordinate system can be determined. The application is then able to translate that world orientation to a local angle in relation to an Asset Container's local coordinate system. Additional features like GPS coordinates and orientation symbols can also be displayed as shown at orientation objects 570.

Figure 7:
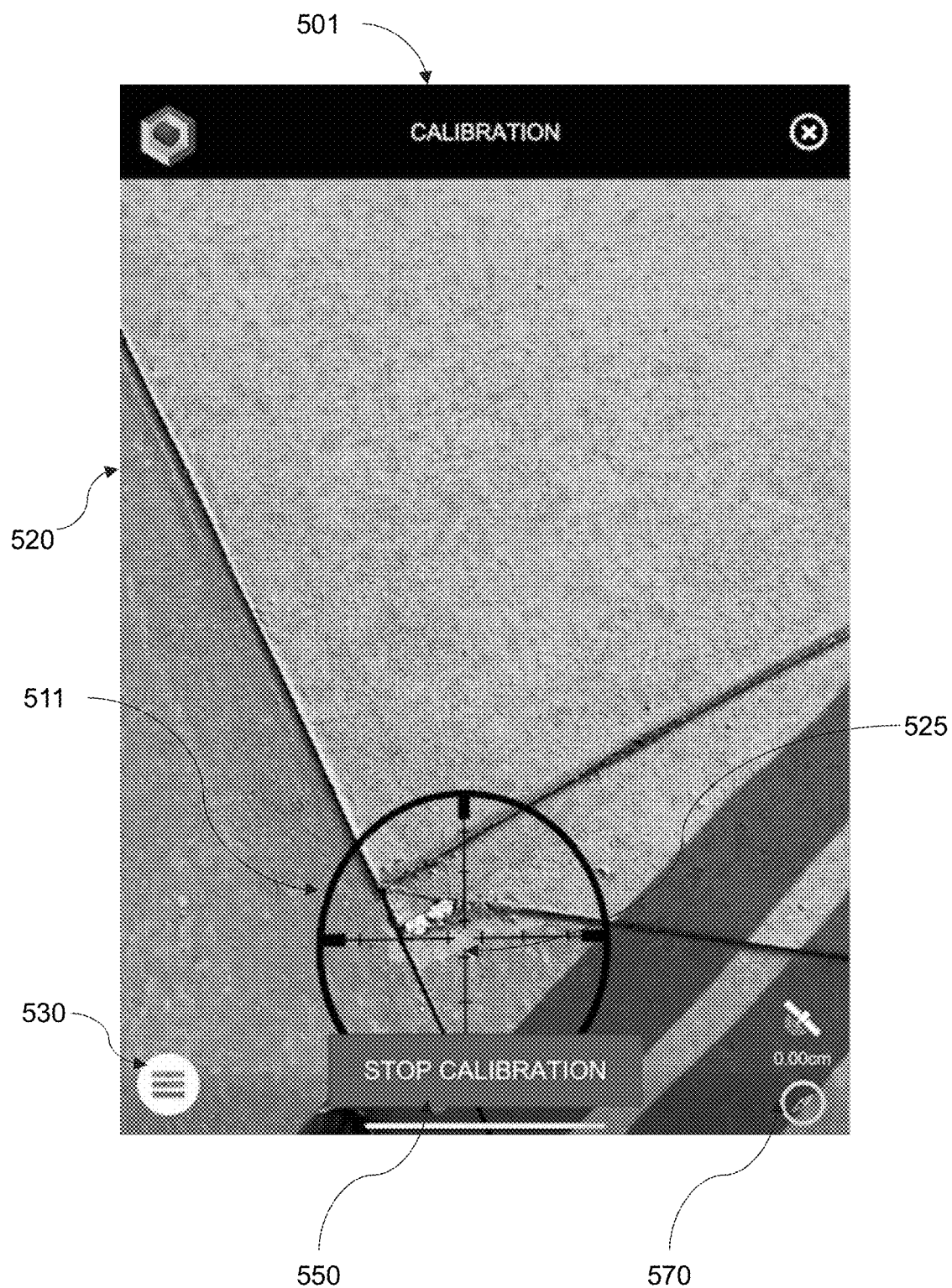
FIG. 7 shows an example screenshot from the calibration process initiated in FIG. 6 displaying virtual crosshairs aligned with an arbitrary point to allow the process to be completed by activating a "Stop Calibration" button.

FIG. 7 shows the mobile device displaying virtual crosshairs 511 on top of the image provided by the device camera visible on display 501. The crosshairs 511 are aligned with an arbitrary point 525 identified in FIG. 6 and configured to allow the user to select a Stop Calibration button 550 as the device is moved closer to the target arbitrary point 525. The latitude and longitude of the controller are determined at this time.

Figure 8:
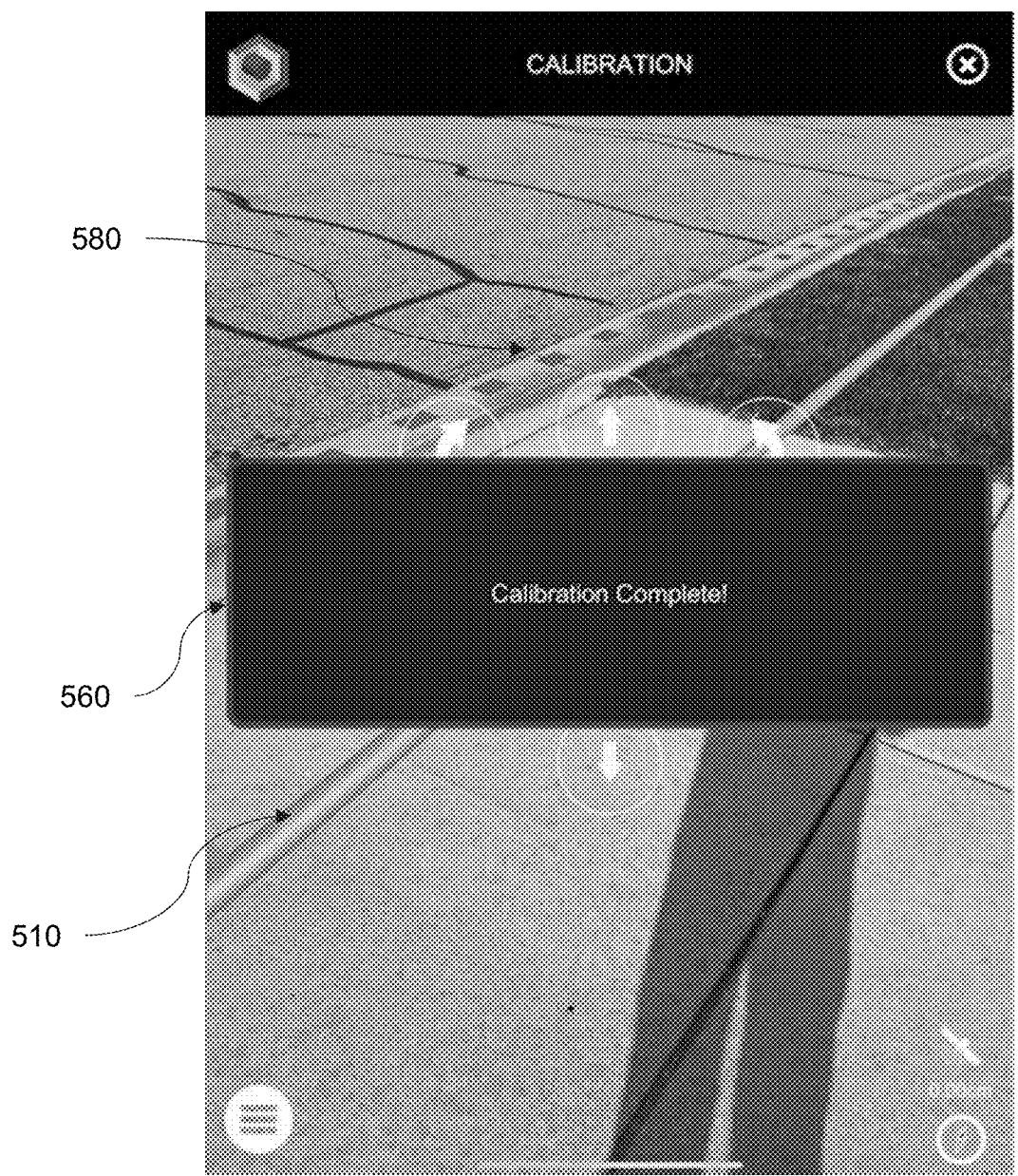
FIG. 8 shows an example screenshot from the calibration process initiated in FIG. 6 at a completion step with a properly aligned virtual image displayed in AR over a real-world image viewable through an associated camera.

FIG. 8 shows virtual objects 510 displayed on top of the base image view 520 provided by the device camera in its actual geographic location and orientation in the real-world once the calibration is complete and represented by an alert generated by the application shown at box 560 with the words "Calibration Complete!" In this example, utility lines 510 are shown as virtual objects that are hidden below the ground. The user is able to visualize underground gas lines, sewer lines and water lines. A dashed line 580 can be shown laid overtop the ground surface visible by the camera of the device to better communicate to the user where that asset is directly located under the ground surface.

Figure 9:
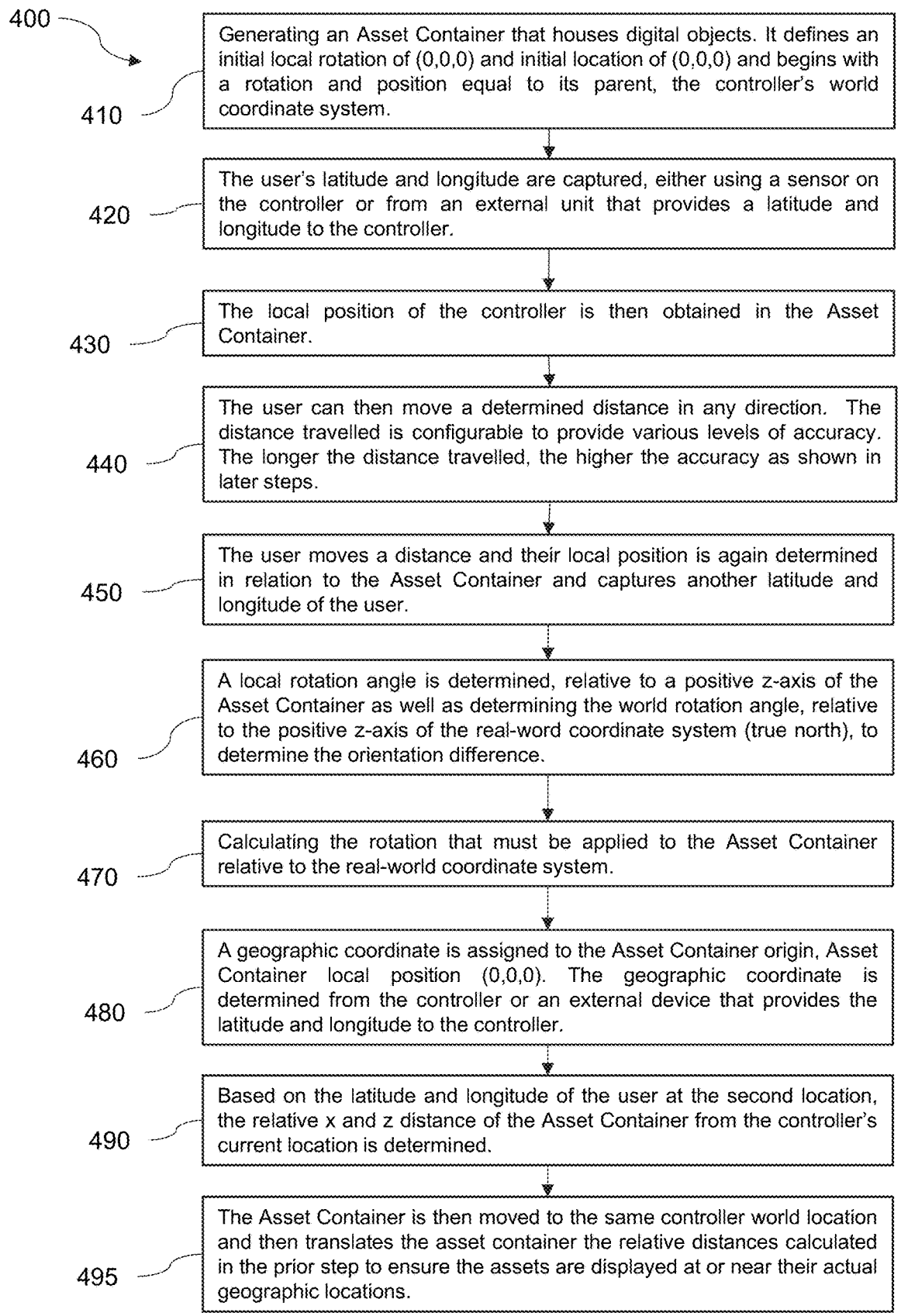
FIG. 9 is an example of another flow chart of the calibration and alignment process of the present disclosure.

In another example, referring to FIG. 9, an calibration process flow diagram 400 is shown according to the present disclosure. Flow diagram 400 is an example calibration process that can be programmed into an application or downloadable program to be executed by a computer system or mobile device. The process includes the following steps:

In step 410, a virtual Asset Container is generated that houses digital objects. The asset container has an initial local rotation of (0,0,0) and initial location of (0,0,0). It begins with a rotation and position equal to its parent, a corresponding controller's world coordinate system.

The process continues to step 420 where a latitude and longitude of a user is captured, either using a sensor on the controller of a corresponding computing device or from an external unit that provides a latitude and longitude to the controller. The controller can be paired with a high accuracy Global Positioning System (GPS), accessible either through the computing or mobile device or hosted on a module built into the computing or mobile device and in signal communication with the controller. The GPS is configured to provide an accurate latitude and longitude. In an example, the accuracy is able to provide a location of 1 cm accuracy or below. Although this level of accuracy is useful, the process can function at a lesser degree of accuracy. The process remains the same regardless of accuracy of the latitude and longitude.

The process continues to step 430 where a local position of the controller is then obtained within the asset container. This can be done by using one or more additional sensors on the controller, as well as an external unit if present, combined with a computer vision algorithm that track the user's movement in the real-world.

The process continues to step 440, wherein the user moves a determined distance in any direction. The distance travelled is configurable to provide various levels of accuracy. The longer the distance travelled, the higher the accuracy as shown in later steps.

Once the user has moved a determined distance, the process continues to step 450 wherein a local position is again determined in relation to the asset container and captures another latitude and longitude of the user.

At step 460, a local rotation angle is determined, relative to the positive z-axis of the Asset Container as well as determining the world rotation angle, relative to a positive z-axis of the real-word coordinate system (true north) to determine an orientation difference.

The process continues to step 470, wherein one or more algorithms, as shown below, are run by the controller or accessible by the controller, a rotation that must be applied to the Asset Container relative to the real-world coordinate system is calculated as follows:

(A) First, determine the angle between two local coordinates relative to the Asset Container local coordinate system positive z-axis:

Double y=System.Math.Cos(positiony2*System.Math.PI/180)*System.Math.Sin((positionx2*System.Math.PI/180)-(positionx1*System.Math.PI/180));

Double x=System.Math.Cos(positiony1*System.Math.PI/180)*System.Math.Sin(positiony2*System.Math.PI/180)-System.Math.Sin(positiony1*System.Math.PI/180)*System.Math.Cos(positiony2*System.Math.PI/180)*System.Math.Cos((positionx2*System.Math.PI/180)-(positionx1*System.Math.PI/180));

Double bearing=System.Math.Atan2(y,x)*180/System.Math.PI;

Double localPointAngle=(bearing+360)%360;

(B) Next, determine the angle between the two geographic coordinates relative to the real-world coordinate system positive z-axis:

Double x=System.Math.Cos(latitude2*System.Math.PI/180)*System.Math.Sin((longitude2*System.Math.PI/180)-(longitude1*System.Math.PI/180));

Double y=System.Math.Cos(latitude1*System.Math.PI/180)*System.Math.Sin(latitude2*System.Math.PI/180)-System.Math.Sin(latitude1*System.Math.PI/180)*System.Math.Cos(latitude2*System.Math.PI/180)*System.Math.Cos((longitude2*System.Math.PI/180)-(longitude1*System.Math.PI/180));

Double bearing=System.Math.Atan2(x,y)*180/System.Math.PI;

Double coordinateAngle=(bearing+360)%360;

(C) Next, get the final rotation to apply to the Asset Container:

float rotation=localPointAngle-(float)coordinateAngle;

Therefore, a −90-degree rotation would be applied to the Asset Container giving the following final orientation, as shown in FIG. 4B. The local coordinate system of the Asset Container now aligns perfectly with the real-world coordinate system and the Asset Container positive z-axis correctly points towards the real-world coordinate system positive z-axis (true north) in the real-world.

Advancing to step 480, a geographic coordinate is assigned to the Asset Container origin, for a local position (0,0,0). The geographic coordinate is determined from the controller or an external device that provides the latitude and longitude to the controller. Advancing to step 490, based on the latitude and longitude of the user at the second location, the relative x and z distance of the Asset Container from the controller's current location is determined. This can be achieved by using formulas such as a Haversine Formula to calculate distance.

At step 495: The Asset Container is then moved to a controller's actual world location and then translates the asset container at relative distances calculated in the prior step 490. This ensures the assets are displayed at or near their actual geographic locations.

Figure 10:
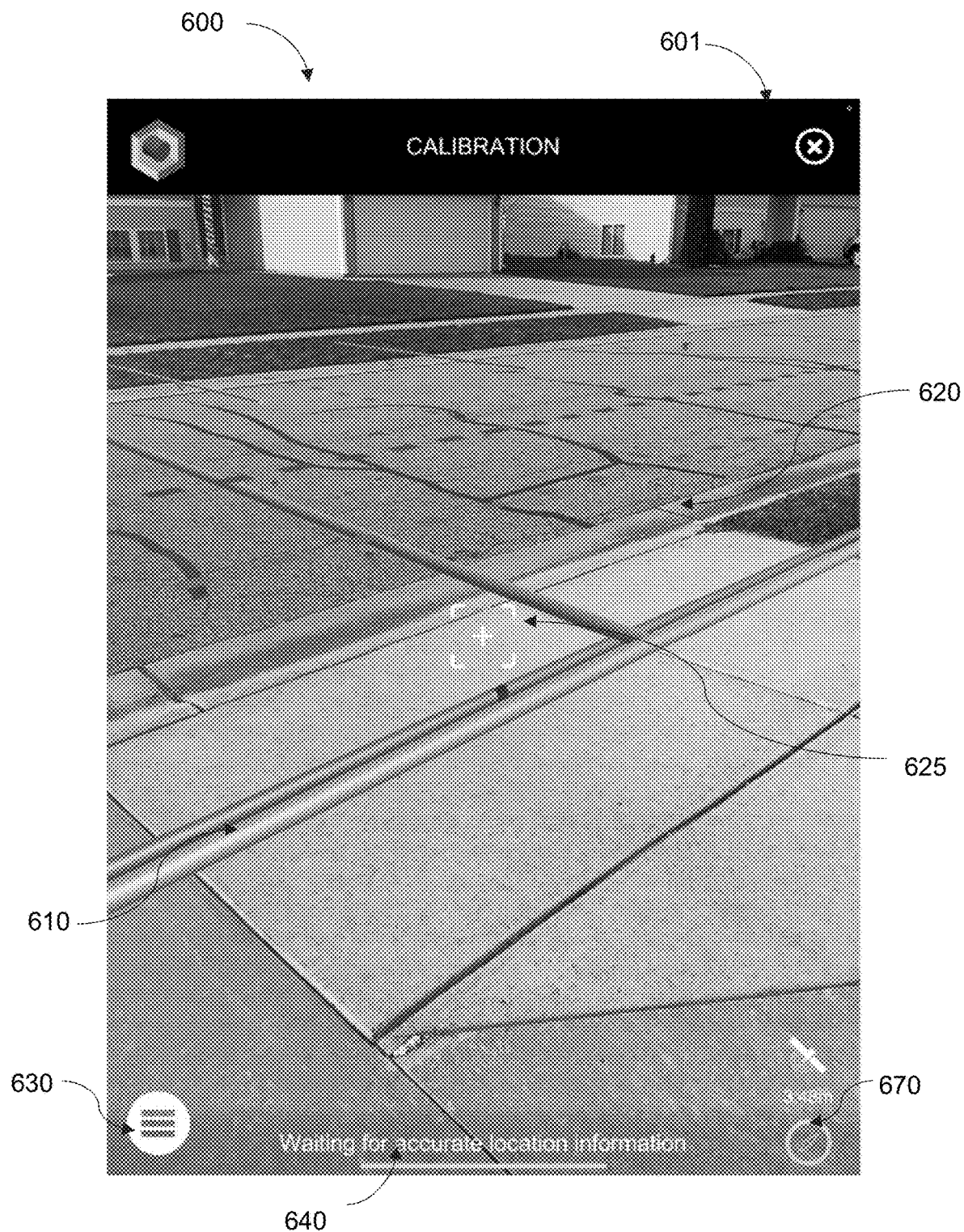
FIG. 10 shows an example screenshot from a mobile device displaying virtual laid over top of a camera view of a surrounding environment at a launch/initialization step of the calibration process of FIG. 9.
Figure 11:
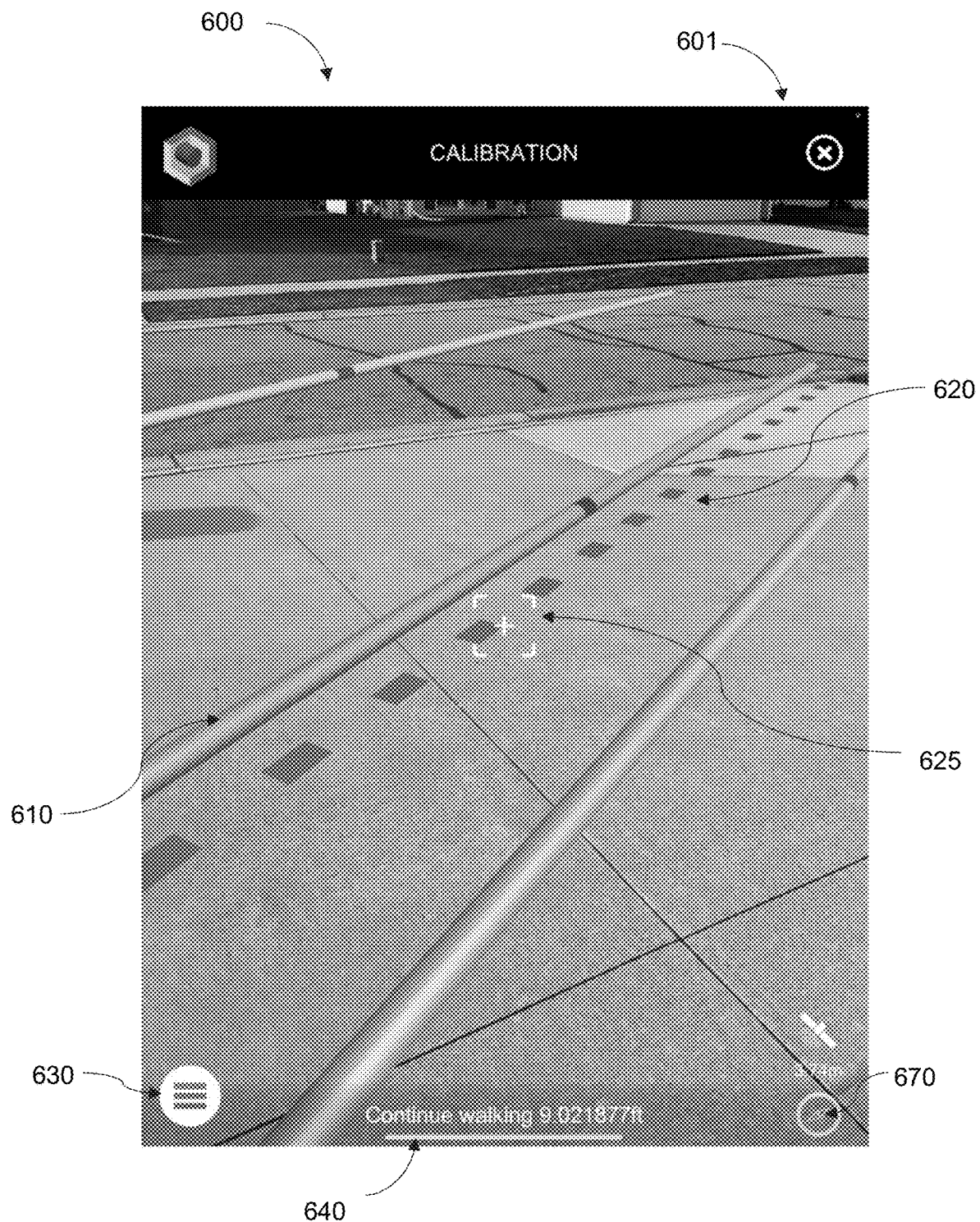
FIG. 11 shows an example screenshot from the calibration process initiated in FIG. 10 displaying virtual target feature aligned with an arbitrary point with instructions to move towards the target.
Figure 12:
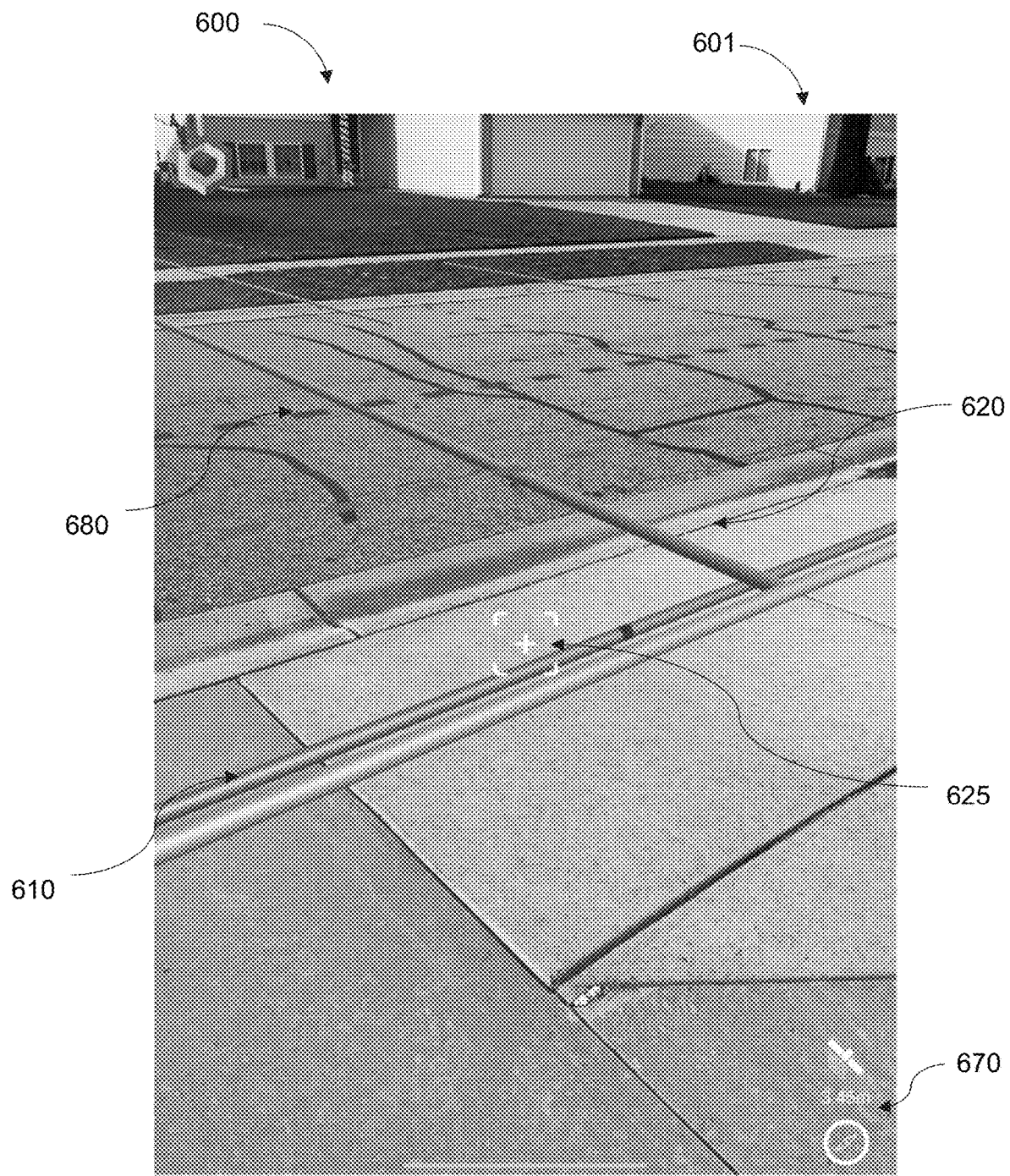
FIG. 12 shows an example screenshot from calibration process initiated in FIG. 10 at a completion step with the properly aligned virtual image displayed over the real-world image viewable through the associated camera.

Referring to FIGS. 10-12, screenshots of a display 601 of a mobile device corresponding to the process steps 400 of FIG. 9 are shown. FIG. 10 shows a screenshot 600 from a mobile device displaying virtual content 610 (image/object) laid over top of a base view 620 (also referred to as a base image) through a camera associated with the device of a surrounding environment in a position and orientation that are not correctly aligned with the real-world at the launch/initialization of the calibration process 400. A menu 630 can be provided on the display. The menu 630 can be provided for accessing other functions and menu items via touchscreen actuation or otherwise. The latitude and longitude of the controller, shown at location indicator 670, are determined at this time. A status indicator 640 can be shown on the display to indicate the current initiation progress including a notification as shown that reads "Waiting for accurate location information." Additionally, using computer vision algorithms, in conjunction with other sensor readings on the controller, the controller's position relative to the Asset Container local coordinate system can be determined. A virtual target feature 625 is provided to identify an arbitrary point or move towards a selected object or point in the base image.

FIG. 11 shows the virtual content (image/object) 610 laid over top of a view 620 through a camera associated with the device of a surrounding environment in a position and orientation that are not correctly aligned with the real-world. A display 640 shows how much further the computing device must move in the real-world in order to complete the calibration process. In this example, the instruction 640 includes a walking instruction to move the device a certain distance. The example of FIG. 11 instructs to "Continue walking 9.021877 ft".

FIG. 12 shows the virtual content 610 displayed on top of the image 620 provided by the device camera in its actual geographic location and orientation in the real-world once the calibration is complete. In this example, underground gas lines, sewer lines and water lines 610 are visible laid over the base image 620. A dashed line or lines 680 are shown on the ground surface to better communicate to the user where that asset is located under the ground surface.

There are a several exemplary use cases for calibration process 200 and/or 400 including, but not limited to, the following:

(a) Utility network visualizations including above ground; and below ground assets (water pipes, electric lines, gas lines, etc.);
(b) BIM model visualizations;
(c) AR navigation and directions;
(d) AR games which place content at actual geographic locations in the world; and
(e) Multiplayer AR games which require precise orientation to ensure digital assets are correctly oriented with the real world for all players.

It should be noted that the steps described in the method of use can be carried out in many different orders according to user preference. The use of "step of" should not be interpreted as "step for", in the claims herein and is not intended to invoke the provisions of 35 U.S.C. § 112 (f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

What is claimed is:

1. An augmented reality (AR) or virtual reality (VR) calibration method comprising:
    (a) providing a computing device having a display, a camera, a processor, a controller, wherein the display is coupled to the camera configured for displaying a base image view of a surrounding environment;
    (b) initiating an executable application program for obtaining and processing location data related to the computing device;
    (c) generating an overlay digital image viewable on the display over the base image;
    (d) generating a virtual asset container and at least one digital object corresponding to the computing device within the asset container, the asset container having a local rotation and initial location corresponding to an initial coordinate system of the computing device at application launch;
    (e) determining first location of the computing device at a first local position within the asset container;
    (f) moving the computing device to a second location away from the first location towards a chosen arbitrary point, wherein a second local position of the computing device within the asset container is determined; and (g) calculating a local rotation angle relative to a positive axis of the asset container and a rotation angle relative to a positive axis of a real-world coordinate system to determine an orientation difference;

(h) obtaining latitude and longitude locations of the computing device at the first location and the second location; and (i) determining an orientation difference between the computing device coordinate system with a real-world coordinate system and adjusting the device coordinate system to align with the real-world coordinate system within the asset container, wherein the axis in the computing device coordinate system points to a true north; and wherein the asset container aligns its coordinate system to the computer device's real-world location and translates relative distances to place virtual images on the display.

2. The calibration method of claim 1, wherein the computing device is a mobile device.

3. The calibration method of claim 1, wherein the first and second locations are captured as latitude and longitude data by a location sensor coupled to the controller.

4. The calibration method of claim 1, wherein the computing device further includes a Global Positioning System (GPS) coupled to the controller.

5. The calibration method of claim 1, wherein a distance between the first location and the second location is configured to increase accuracy as the distance moved increases.

6. The calibration method of claim 1, wherein the orientation difference is determined by:

(i) determining an angle between the real-world coordinate system relative to the asset container local coordinate system;

(ii) followed by subtracting an angle between two geographic coordinates relative to the real-world coordinate system positive z-axis from the angle determined in part (i); and (iii) obtaining a final rotation to apply to the asset container.

7. The calibration method of claim 1, wherein the rotation to be applied to the asset container relative to the real-world coordinate system is calculated by executing in a computer program the steps of:

(a) establishing an angle of the computing device in relation to the asset container;

(b) followed by subtracting from the angle determined in part (a) an angle between two geographic coordinates relative to the real-world coordinate system positive z-axis; and (c) determining a final rotation to apply to the asset container.

8. The calibration method of claim 1, wherein the orientation difference is calculated by first determining an angle between the real-world coordinate system relative to the asset container local coordinate system.

9. The calibration method of claim 1, wherein the overlay digital image is a digital object corresponding to an asset within the surrounding environment field and a distance from the computing device to the digital object is determined.

10. The calibration method of claim 9, wherein the digital object corresponds to hidden or visible utility assets and the executable application program is configured to obtain and process utility asset data to display at least one of location, identification, and depth data of the utility asset.

11. The calibration method of claim 1, wherein the display is a touchscreen display having executable function buttons accessible on the display to initiate calibration.

12. The calibration method of claim 1, wherein a calibration complete alert is generated upon completion.

13. The calibration method of claim 1, wherein the initial coordinate system and the real-world coordinate system define an x-axis, y-axis, and z-axis wherein each axis is in a 90° relationship to the other two axes.

14. The calibration method of claim 1, wherein the executable program is configured to refresh location information continuously.

15. The calibration method of claim 1, wherein virtual crosshairs are generated as an overlay object configured to be placed on a desired real object within the base view and calculating a distance and location data associated with the real object relative to the computing device.

16. The calibration method of claim 1, wherein the computing device includes a wireless communication module configured for obtaining location data from a remote server.

17. The calibration method of claim 1, wherein the rotation and orientation calibration is completed within a time equal to or less than one minute.

18. The calibration method of claim 1, wherein the rotation and orientation calibration is completed within a time equal to or less than thirty seconds.

19. The calibration method of claim 1, wherein the rotation and orientation calibration is completed within a time equal to or less than ten seconds.

* * * * *